United States Patent
Wu et al.

(10) Patent No.: US 10,564,895 B2
(45) Date of Patent: Feb. 18, 2020

(54) I/O PERFORMANCE ENHANCEMENT OF SOLID-STATE DATA STORAGE DEVICES

(71) Applicant: ScaleFlux, Inc., San Jose, CA (US)

(72) Inventors: Qi Wu, San Jose, CA (US); Duy Nguyen, Fremont, CA (US); Prathamesh Amritkar, San Jose, CA (US); Qing Li, San Jose, CA (US)

(73) Assignee: SCALEFLUX, INC., San Jose, CA (US)

( * ) Notice: Subject to any disclaimer, the term of this patent is extended or adjusted under 35 U.S.C. 154(b) by 18 days.

(21) Appl. No.: 15/977,275

(22) Filed: May 11, 2018

(65) Prior Publication Data

US 2018/0357011 A1 Dec. 13, 2018

Related U.S. Application Data

(60) Provisional application No. 62/516,589, filed on Jun. 7, 2017.

(51) Int. Cl.
*G06F 3/06* (2006.01)
*G06F 12/02* (2006.01)

(52) U.S. Cl.
CPC .......... *G06F 3/0659* (2013.01); *G06F 3/0613* (2013.01); *G06F 3/0679* (2013.01); *G06F 12/0246* (2013.01); *G06F 12/0253* (2013.01); *G06F 2212/1016* (2013.01); *G06F 2212/7205* (2013.01)

(58) Field of Classification Search
CPC .... G06F 12/0246; G06F 3/0659; G06F 3/061; G06F 3/0688; G06F 2212/1016; G06F 2212/2022; G06F 2212/1024; G06F 9/4881; G06F 2212/7205; G06F 12/0253
See application file for complete search history.

(56) References Cited

U.S. PATENT DOCUMENTS

| | | | |
|---|---|---|---|
| 8,341,300 B1* | 12/2012 | Karamcheti | G06F 13/1642 710/6 |
| 8,880,775 B2* | 11/2014 | Stefanus | G06F 12/0246 711/103 |
| 9,436,595 B1* | 9/2016 | Benitez | G06F 12/0246 |
| 2013/0290601 A1* | 10/2013 | Sablok | G06F 12/0246 711/103 |
| 2016/0110105 A1* | 4/2016 | Karamcheti | G06F 3/061 710/302 |
| 2016/0124847 A1* | 5/2016 | Malwankar | G06F 12/0253 711/103 |

(Continued)

*Primary Examiner* — Adam M Queler
*Assistant Examiner* — Alex G Olson
(74) *Attorney, Agent, or Firm* — Hoffman Warnick LLC

(57) ABSTRACT

An infrastructure, method and controller card for managing flash memory in a storage infrastructure. A system is provided that includes flash memory; and a controller that includes: an I/O request handler for handling standard read and write (R/W) operations requested from a host; a garbage collection (GC) system that performs a GC process on the flash memory in response to a threshold condition, wherein the GC process includes GC-induced R/W operations; and a scheduler that interleaves standard R/W operations with GC-induced R/W operations, wherein the scheduler calculates minimum and maximum boundaries for GC-induced R/W operations for a GC process based on an estimated GC latency.

20 Claims, 4 Drawing Sheets

(56) References Cited

U.S. PATENT DOCUMENTS

| | | | |
|---|---|---|---|
| 2016/0170656 A1* | 6/2016 | Tressler | G06F 3/0604 |
| | | | 711/103 |
| 2016/0321172 A1* | 11/2016 | Jinzenji | G06F 12/0246 |
| 2017/0286288 A1* | 10/2017 | Higgins | G06F 12/0246 |
| 2017/0357447 A1* | 12/2017 | Jung | G06F 3/061 |
| 2018/0165022 A1* | 6/2018 | Tomic | G06F 11/108 |
| 2018/0267893 A1* | 9/2018 | Barzik | G06F 12/0246 |
| 2019/0087089 A1* | 3/2019 | Yoshida | G06F 3/061 |

\* cited by examiner

I/O PERFORMANCE ENHANCEMENT OF SOLID-STATE DATA STORAGE DEVICES

TECHNICAL FIELD

The present invention relates to the field of solid-state data storage devices, and particularly to improving the write performance consistency of solid-state data storage devices.

BACKGROUND

Solid-state data storage devices, which use non-volatile NAND flash memory technology, are being pervasively deployed in various computing and storage systems. In addition to one or multiple NAND flash memory chips, each solid-state data storage device must contain a controller that manages all the NAND flash memory chips. NAND flash memory cells are organized in an array-block-page hierarchy, where one NAND flash memory array is partitioned into a large number (e.g., thousands) of blocks, and each block contains a certain number of pages (e.g., 256). The size of each flash memory physical page typically ranges from 8 kB to 32 kB, and the size of each flash memory block is typically tens of MBs. Data are programmed and fetched in units of pages. However, flash memory cells must be erased before being re-programmed, and the erase operation is carried out in the unit of block (i.e., all the pages within the same block must be erased at the same time). Due to the unit size mismatch between write and erase operations, the storage device controller must carry out a garbage collection (GC) operation: Before erasing a flash memory block, the controller has to copy all the valid data from this block to other flash memory block(s). The purpose of GC is to reclaim flash memory storage space being occupied by stale flash memory pages (i.e., those flash memory pages whose content have become invalid and useless) and make them available to serve future write requests.

As a background operation, GC is transparent to end users. However, the flash memory read/write activities invoked by GC inevitably interfere with normal I/O requests. Such interference contributes to increased storage device I/O performance variation (i.e., inconsistency, unpredictability, reduced user experience, etc.). Many applications are very sensitive and intolerant to I/O performance variation, and often consider I/O performance variation as a metric that is much more important than average I/O performance.

SUMMARY

Accordingly, an embodiment of the present disclosure is directed to a system and method for improving I/O performance variation of solid-state data storage devices.

A first aspect provides a storage infrastructure, comprising: flash memory; and a controller that includes: an I/O request handler for handling standard read and write (R/W) operations requested from a host; a garbage collection (GC) system that performs a GC process on the flash memory in response to a threshold condition, wherein the GC process includes GC-induced R/W operations; and a scheduler that interleaves standard R/W operations with GC-induced R/W operations, wherein the scheduler calculates minimum and maximum boundaries for GC-induced R/W operations for the GC process based on an estimated GC latency.

A second aspect provides a controller card for managing flash memory in a storage infrastructure, comprising: an I/O request handler for handling standard read and write (R/W) operations requested from a host; a garbage collection (GC) system that performs a GC process on the flash memory in response to a threshold condition, wherein the GC process includes GC-induced R/W operations; and a scheduler that interleaves standard R/W operations with GC-induced R/W operations, wherein the scheduler calculates minimum and maximum boundaries for GC-induced R/W operations for the GC process based on an estimated GC latency.

A third aspect provides a method of managing flash memory in a storage infrastructure, comprising: receiving standard read and write (R/W) operations requested from a host; performing a garbage (GC) process on the flash memory in response to a threshold condition, wherein the GC process includes GC-induced R/W operations; and interleaving standard R/W operations with GC-induced R/W operations, wherein the interleaving includes calculating minimum and maximum boundaries for GC-induced R/W operations for a GC process based on an estimated GC latency.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiments of the invention, examples of which are illustrated in the accompanying drawings.

Figure 1:
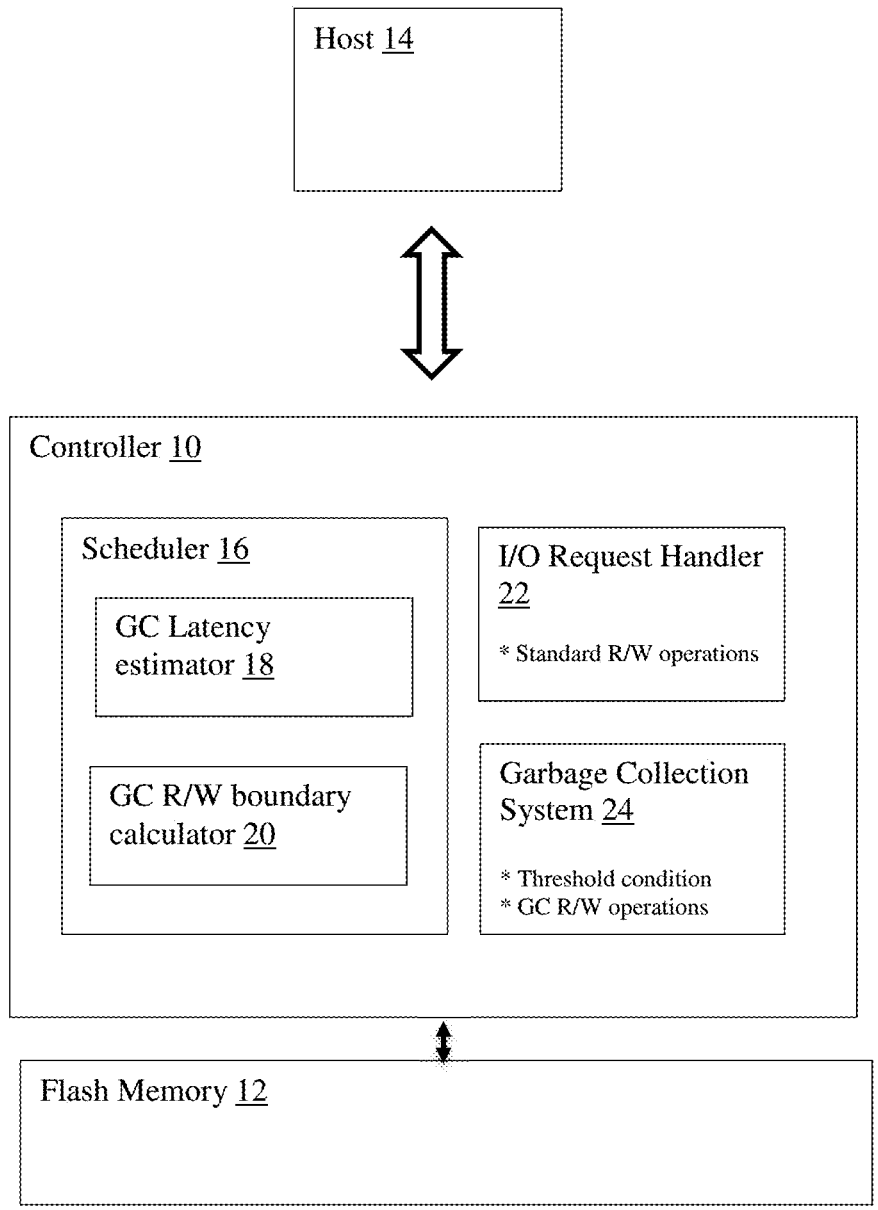
FIG. 1 depicts a storage infrastructure having a controller for managing flash memory.

FIG. 1 depicts a storage infrastructure that generally includes a storage device controller ("controller") 10 for reading and writing data to a solid state memory, i.e., flash memory 12. Controller 10 may be implemented in the form of a controller card or in any other manner. Controller 10 includes a scheduler 16 that schedules standard read and write (R/W) operations requested from a host 14, e.g., using standard I/O request handler 22. Controller 10 also includes a garbage collection (GC) system 24 that performs garbage collection in flash memory 12. Garbage collection occurs in response to a threshold condition, e.g., a predefined amount of available flash memory 12, and requires GC-induced R/W operations that must also be scheduled by scheduler 16.

As noted, NAND flash memory cells are organized in an array-block-page hierarchy, where one NAND flash memory array is partitioned into a large number (e.g., thousands) of blocks, and each block contains a certain number of pages (e.g., 256). The size of each flash memory physical page typically ranges from 8 kB to 32 kB, and the size of each flash memory block is typically tens of MBs. Data are programmed and fetched in units of pages. However, flash memory cells must be erased before being re-programmed, and the erase operation is carried out in the unit of block (i.e., all the pages within the same block must be erased at the same time). Due to the unit size mismatch between write and erase operations, the storage device controller 10 must carry out the garbage collection (GC) operation.

Figure 2:
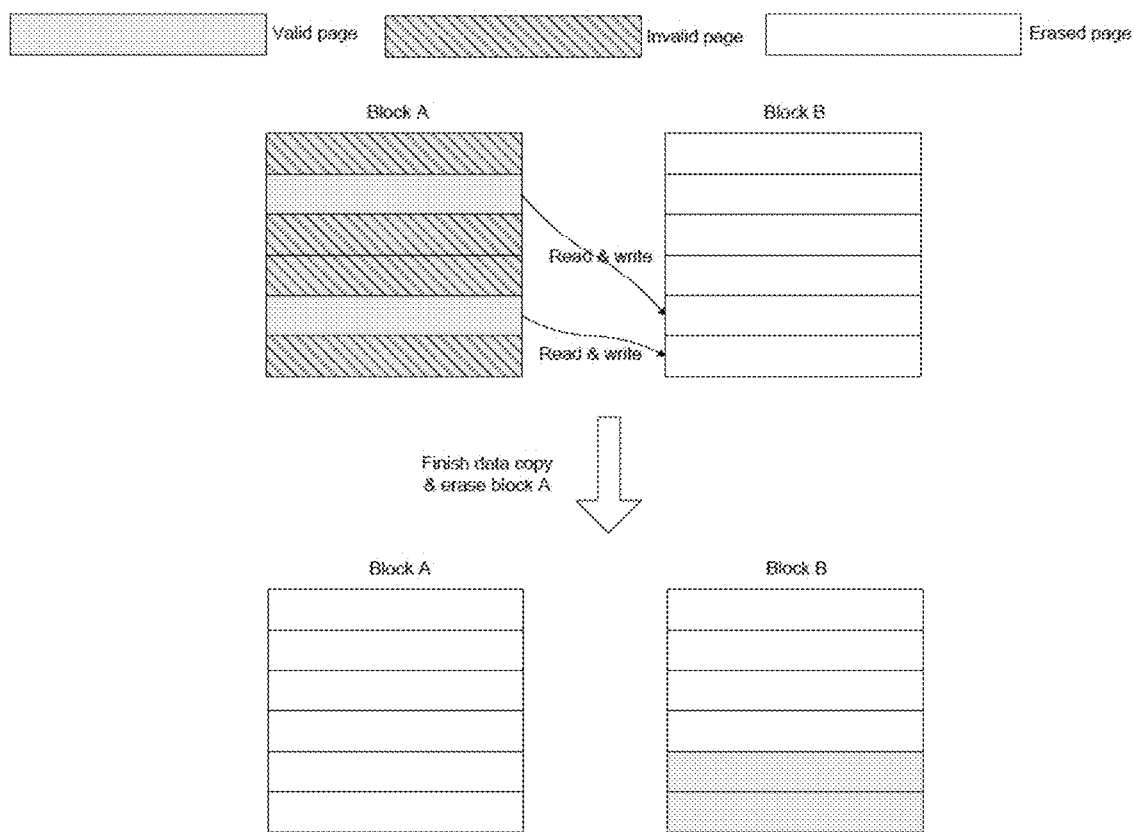
FIG. 2 illustrates a garbage collection process.

Before erasing a flash memory block, the controller 10 has to copy all the valid data from the block to other flash memory block(s). An example of this is depicted in FIG. 2 in which Block A has both valid and invalid pages and, e.g., the GC system 24 is triggered because the number of available empty flash memory blocks (i.e., the flash memory blocks which have been erased and not been written yet) have fallen below a certain threshold. Once GC system 24 is invoked, the storage device controller 10 issues GC-induced read and write (R/W) operations to copy valid pages from the to-be-erased flash memory Block A to other available blocks, e.g., Block B. Once the copying is complete, Block A can be erased and the valid pages are available in Block B.

If the controller 10 schedules GC as an indivisible process, i.e., all the GC-induced flash memory R/W operations and the subsequent block erase operations are issued continuously without being interleaved with other flash memory operations (e.g., those serving normal I/O requests), the scheduler 16 could cause many standard R/W operations to be stalled, leading to significant storage device I/O performance variation, which may be noticeable by users or other processes interfacing with host 14. Therefore, the scheduler 16 interleaves the GC-induced R/W operations and standard R/W operations together. Hence, the storage device I/O performance variation strongly depends on two factors: (1) how frequently the storage device controller has to invoke GC, and (2) how the storage device controller 10 schedules and interleaves GC-induced read/write operations and standard R/W operations.

The described embodiments reduce storage device I/O performance variation by dynamically calculating an optimal range of GC-induced R/W operations relative to standard R/W operations whenever a GC process in initiated. Once the range is calculated, the scheduler 16 can optimally interleave the two, e.g., to maximize GC-induced or standard R/W operations. To calculate the range, scheduler 16 utilizes a GC latency estimator 18 that estimates the total latency of a GC process, and a GC boundary calculator 20 that determines minimum and maximum numbers of GC-induced R/W operations (i.e., boundaries) that should occur during time segments of the GC process.

Figure 3:
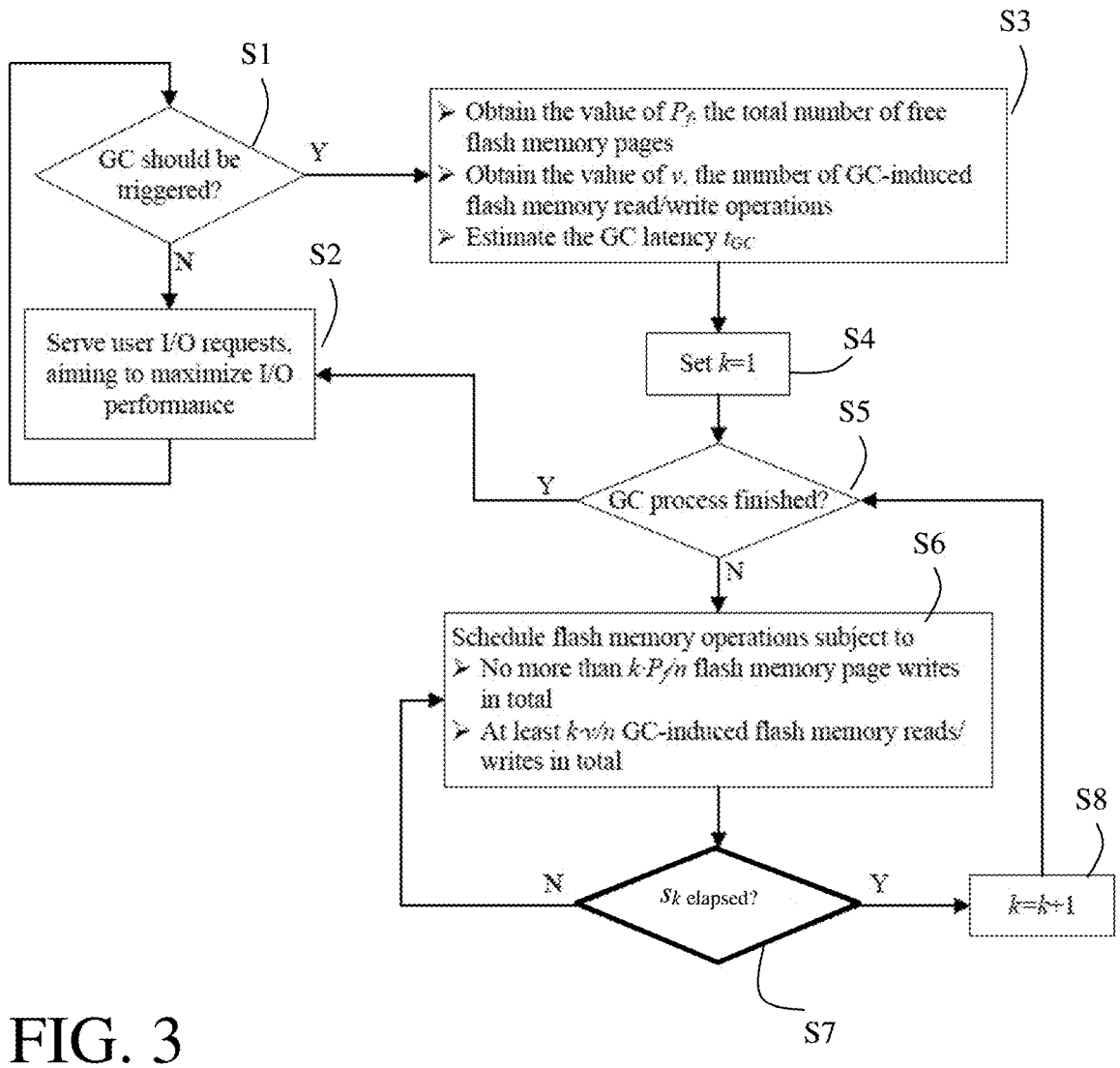
FIG. 3 depicts an operational flow diagram for implementing a process according to an embodiment of the invention.

FIG. 3 depicts an illustrative process for determining the boundaries. At S1, a determination is made whether GC should be triggered, and if not, then normal user I/O requests (i.e., standard R/W operations) are served to maximize I/O performance at S2. If however the GC is triggered at S1, then the storage device controller 10 begins the process of determining minimum and maximum boundaries to be used for GC-induced R/W operations. At S3, the process (a) obtains the total number of free flash memory pages $P_f$, (b) calculates the total number of flash memory page read/write operations induced by this GC process, denoted as v, and (c) estimates the total latency of this GC process, denoted as $t_{GC}$ (i.e., the time difference from the start to the completion of this GC process). $P_f$ denote the number of free flash memory pages available to serve writes immediately after this GC process is triggered. In addition, a variable k is initially set to 1 at S4.

Using the gathered information, the estimated latency time window $t_{GC}$ is partitioned into n equal-length time slots, with $s_i$ denoting the i-th time slot ($1 \leq i \leq n$). The elapsed time of the GC is tracked relative to the times slots, such that the boundary calculation process is aware of which time slot the GC process currently falls within, e.g., $s_1$, $s_2$, etc. Assuming the GC process is not completed at S5, then minimum and maximum boundaries are determined at S6 for GC-induced R/W operations for a time segment with reference to the current time slot tracked using variable k. For instance, during a first time segment (k=1, first time slot), the minimum and maximum boundaries may be calculated as 10 and 50 GC-induced R/W operations, respectively; during a second segment (k=2, the first and second time slot), the minimum and maximum boundaries may be calculated as 20 and 100 cumulative GC-induced R/W operations, respectively; during a third segment (k=3, the first, second and third time slot), the minimum and maximum boundaries may be calculated as 30 and 150 cumulative GC-induced R/W operations, respectively; etc. Note that the minimum and maximum boundaries are cumulatively determined for the entire time segment of the GC process through the current time slot. Once calculated, the boundary limits are utilized by the scheduler 16 while operating within a given time slot $s_k$. The variable k is incremented at S8 whenever a current time slot $s_i$ elapses at S7, and the loop continues until the GC process is determined complete at S5. In this embodiment, the maximum number of GC-induced R/W operations allowed by the end of the time slot $s_k$ is determined as $k \cdot P_f/n$, and the minimum for the same period is determined as $k \cdot v/n$.

By determining such boundaries, higher data storage efficiency and improved computing operations can be achieved. For example, during low activities of standard user based I/O requests, the storage device controller 10 is able to allow more GC-induced R/W operations (i.e., more than the minimum $k \cdot v/n$ flash memory page writes by the end of the time slot $s_k$), which could allow the GC process to complete sooner than the estimated latency of $t_{GC}$.

Note however that the overall effectiveness of the process is dependent on accurately estimating the GC process latency $t_{GC}$. Any number of methods for estimating the GC process latency $t_{GC}$ may be utilized, spanning different trade-offs between accuracy and complexity. The simplest method is to simply set $t_{GC}$ as a constant (e.g., 5 seconds). Another simple method is to use the latency of the previous GC as an estimation of this GC.

Alternatively, a more complex method may be implemented that relies on the recent history of user I/O requests. In this approach, to more accurately estimate the GC process latency $t_{GC}$, the controller 10 carries out an emulation process in which it is assumed that the standard R/W operations (i.e., user I/O requests) statistics over the most recent l timing windows will recursively repeat in the future. Namely, a previous set of l timing windows of length $t_w$ can be statistically analyzed to predict future behavior. In this approach, the controller 10 records the statistics (e.g., number and size) of user I/O requests within each timing window.

Figure 4:
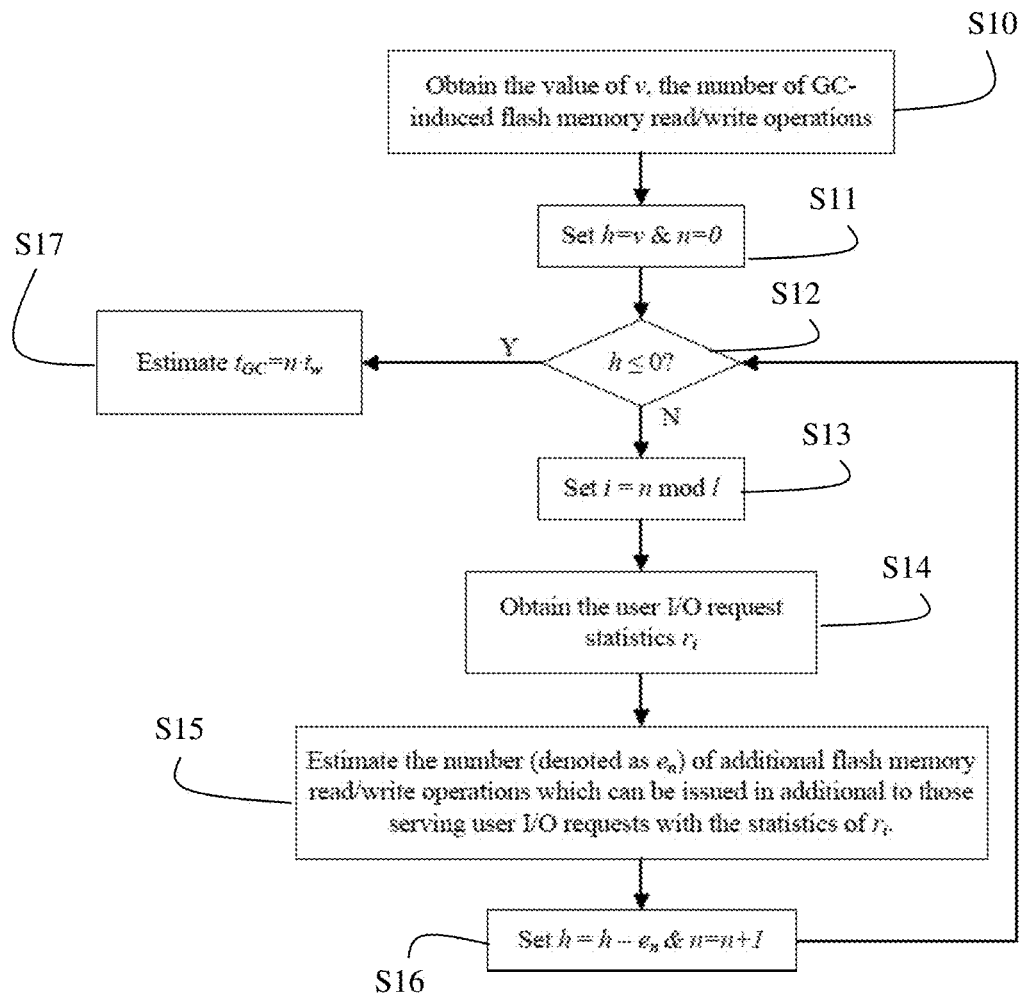
FIG. 4 depicts an operational flow diagram of an invented method for estimating GC process latency $t_{GC}$ according to an embodiment of the invention.

FIG. 4 depicts an illustrative embodiment. At S10, the value v is obtained which denotes the total number of flash memory page read/write operations induced by this GC process. At S11, the process sets variable h=v, and variable n=0. The process loops until h is less than or equal to zero at S12. At S13, the process sets i=n mod l in which ($0 \leq i \leq l-1$) and at S14 the I/O user request statistics $r_i$ are obtained in which $r_i$ denotes the user I/O request statistics information associated with the i-th length-$t_w$ timing window. As shown, for each value of n=0, 1, 2, 3, . . . , the controller 10 carries out the following operation: given the user I/O request statistics $r_i$ (where i=n mod l), the controller at S15 estimates the number (denoted as $e_n$) of additional flash memory read/write operations which can be issued in addition to those serving user I/O requests using the statistics of $r_i$. The process then subtracts $e_n$ from h at S16. The controller 10 repeats the process until h reaches 0, at which time it estimates the GC latency as $t_{GC}=n \cdot t_w$.

It is understood that the controller 10 may be implemented in any manner, e.g., as an integrated circuit board that includes a processing core, I/O and processing logic. Processing logic may be implemented in hardware/software, or a combination thereof. For example, some of the aspects of the processing logic may be implemented using field programmable gate arrays (FPGAs), ASIC devices, or other hardware-oriented system.

Other aspects may be implemented with a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, etc. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

The invention claimed is:

1. A storage infrastructure, comprising:
   flash memory; and
   a controller that includes:
   an I/O request handler for handling standard read and write (R/W) operations requested from a host;
   a garbage collection (GC) system that performs a GC process on the flash memory in response to a threshold condition, wherein the GC process includes GC-induced R/W operations and has an estimated GC latency divided into a plurality of time slots; and
   a scheduler that interleaves standard R/W operations with GC-induced R/W operations, wherein the scheduler calculates minimum and maximum numbers of GC-induced R/W operations for each of the plurality of time slots.

2. The storage infrastructure of claim 1, wherein the minimum and maximum numbers of GC-induced R/W operations are further determined based on a total number of free pages in the flash memory and a total number of GC-induced R/W operations required for the GC process.

3. The storage infrastructure of claim 2, wherein the estimated GC latency is divided into n time slots and during the GC process, minimum and maximum boundaries are calculated each time a time slot elapses until the GC process finishes.

4. The storage infrastructure of claim 3, wherein:
   the minimum boundary is defined as $k \cdot v/n$; and
   the maximum boundary is defined as $k \cdot P_f/n$,
   where k is a current time slot, v is the total number of GC-induced R/W operations, and $P_f$ is the total number of free memory pages.

5. The storage infrastructure of claim 1, wherein the estimated GC latency is a fixed value.

6. The storage infrastructure of claim 1, wherein the estimated GC latency is based on a previous GC latency.

7. The storage infrastructure of claim 1, wherein the estimated GC latency is based on statistically analyzing standard R/W operations during prior time windows.

8. A controller card for managing flash memory in a storage infrastructure, comprising:
   an I/O request handler for handling standard read and write (R/W) operations requested from a host;
   a garbage collection (GC) system that performs a GC process on the flash memory in response to a threshold condition, wherein the GC process includes GC-induced R/W operations and has an estimated GC latency divided into a plurality of time slots; and
   a scheduler that interleaves standard R/W operations with GC-induced R/W operations, wherein the scheduler calculates minimum and maximum numbers of GC-induced R/W operations for each of the plurality of time slots.

9. The controller card of claim 8, wherein the minimum and maximum numbers of GC-induced R/W operations are further determined based on a total number of free pages in the flash memory and a total number of GC-induced R/W operations required for the GC process.

10. The controller card of claim 9, wherein the estimated GC latency is divided into n time slots and during the GC process, minimum and maximum boundaries are calculated each time a time slot elapses until the GC process finishes.

11. The controller card of claim 10, wherein:
    the minimum boundary is defined as $k*v/n$; and
    the maximum boundary is defined as $k*P_f/n$,
    where k is a current time slot, v is the total number of GC-induced R/W operations, and $P_f$ is the total number of free memory pages.

12. The controller card of claim 8, wherein the estimated GC latency is a fixed value.

13. The controller card of claim 8, wherein the estimated GC latency is based on a previous GC latency.

14. The controller card of claim 8, wherein the estimated GC latency is based on statistically analyzing standard R/W operations during prior time windows.

15. A method of managing flash memory in a storage infrastructure, comprising:
    receiving standard read and write (R/W) operations requested from a host;
    performing a garbage (GC) process on the flash memory in response to a threshold condition, wherein the GC process includes GC-induced R/W operations and has an estimated GC latency divided into a plurality of time slots; and
    interleaving standard R/W operations with GC-induced R/W operations, wherein the interleaving includes calculating minimum and maximum numbers of GC-induced R/W operations for each of the plurality of time slots.

16. The method of claim 15, wherein the minimum and maximum numbers of GC-induced R/W operations are further determined based on a total number of free pages in the flash memory and a total number of GC-induced R/W operations for the GC process.

17. The method of claim 16, wherein the estimated GC latency is divided into n time slots and during the GC process, minimum and maximum boundaries are calculated each time a time slot elapses until the GC process finishes.

18. The method of claim 17, wherein:
    the minimum boundary is defined as $k*v/n$; and
    the maximum boundary is defined as $k*Pf/n$,
    where k is a current time slot, v is the total number of GC-induced R/W operations, and Pf is the total number of free memory pages.

19. The method of claim 15, wherein the estimated GC latency is one of a fixed value or one based on a previous GC latency.

20. The method of claim 15, wherein the estimated GC latency is based on statistically analyzing standard R/W operations during prior time windows.

* * * * *